(12) United States Patent
Goodwin

(10) Patent No.: US 6,375,042 B1
(45) Date of Patent: Apr. 23, 2002

(54) BEVERAGE DISTRIBUTING UNIT

(75) Inventor: Clive Goodwin, Bangor (GB)

(73) Assignee: Valpar Industrial Limited, Bangor (GB)

( * ) Notice: Subject to any disclaimer, the term of this patent is extended or adjusted under 35 U.S.C. 154(b) by 0 days.

(21) Appl. No.: 09/139,381

(22) Filed: Aug. 6, 1998

(30) Foreign Application Priority Data

Aug. 6, 1997 (GB) .............................................. 9716535

(51) Int. Cl.[7] .................................................. B67D 5/56
(52) U.S. Cl. .................................................. 222/129.1
(58) Field of Search .......................... 222/129.1, 129.2, 222/129.3, 129.4, 135, 485, 146

(56) References Cited

U.S. PATENT DOCUMENTS

| | | | | |
|---|---|---|---|---|
| 3,422,634 A | * | 1/1969 | Brown ..................... | 222/129.1 |
| 4,034,571 A | * | 7/1977 | Bollinger ................... | 222/146 |
| 4,781,309 A | * | 11/1988 | Vogel ....................... | 222/129.1 |
| 4,801,048 A | * | 1/1989 | Credle, Jr. et al. ........ | 222/129.1 |
| 5,392,960 A | * | 2/1995 | Kendt et al. .............. | 222/129.1 |
| 5,884,813 A | * | 3/1999 | Bordonaro et al. ....... | 222/129.1 |
| 5,890,626 A | * | 4/1999 | Wolski et al. ............ | 222/129.1 |

* cited by examiner

*Primary Examiner*—Philippe Derakshani
*Assistant Examiner*—Thagh H. Bui
(74) *Attorney, Agent, or Firm*—Ronald E. Greigg

(57) ABSTRACT

A unit for supplying one or more beverages or beverage components from one or more sources or source supplies to one or more dispensing heads. The unit comprises one or more source receiving lines extending into one or more delivery lines for connection to the or each dispensing head, wherein at least one of the lines is plastic tubing, the delivery end or ends of which is or are shaped to fit directly into the or each associated dispensing head. The unit may supply individual dispensing heads with e.g., bear, or multiple heads with e.g., beer or soft drinks. The unit can form a tower unit for use with multiple post mix dispenser. Shaping of the delivery ends of the lines provides extensive utility and parts reduction.

18 Claims, 5 Drawing Sheets

BEVERAGE DISTRIBUTING UNIT

This invention relates to improvements relating to a beverage distributing unit, particularly but not exclusively for use in a multiple soft drink post mix dispenser.

One major type of multiple soft drink dispenser involves the supply of a number of individual drink concentrates, syrups, etc. (hereinafter collectively termed "spyrups") and a base liquid, usually still or carbonated water (hereinafter collectively termed "water") through separate lines into and through a "tower" distributing unit. The water generally feeds into a circulating manifold which has a number of branch lines. Each syrup line and an associated manifold branch line are connected through a mounting block to a dispensing head assembly in which the water and syrup are mixed immediately prior to dispensing. The dispensing head assembly can include a valve, used to prevent the flow of liquid therethrough upon disconnection of the dispensing head so as to allow the heads to be repaired or replaced individually without disconnection of the complete tower supply.

The manifold, its supply lines and its supply branches are generally made from metal, especially stainless steel. Stainless steel does not corrode, it is non-toxic, and the parts can be welded together. However, welding stainless steel is expensive, and the resulting structure is obviously rigid, such that all remaining parts of the apparatus must fit around it.

Whilst the syrup lines have generally been metallic as well, some lines are now made of plastic to increase flexibility of manufacture. However, the plastic lines must still have metallic connector pieces fitted at their 'delivery' ends to mate with the entry ports of the dispensing head assemblies. Pipe clips, e.g., jubilee clips, are also required to secure the syrup lines and metallic connector pieces together. These parts increase the cost and labour of manufacture of a tower. The clips can also loosen and therefore leak, and the protuberance of the clips makes it difficult to achieve continuous insulation around the lines.

Furthermore, different dispensing head assemblies can have different shaped entry ports, thus requiring a range of different shaped connector pieces to be manufactured.

The same problems can occur similarly even in the connection of a single dedicated delivery line, such as for the supply of bear to a single dispensing head or tap.

It is an object of the present invention to provide a simplified and improved manufacture of a beverage distributing unit as well as reduce the number of parts involved.

According to one aspect of the present invention, there is provided a unit for supplying one or more beverages or beverage components from one or more sources or source supplies to one or more dispensing heads, comprising one or more source receiving lines extending into one or more delivery lines for connection to the or each dispensing head, wherein at least one of the lines is plastic tubing, the delivery and or ends of which is or are shaped to fit directly into the or each associated dispensing head.

The delivery end(s) of a plastic line may be shaped to fit directly into a dispensing head either by reforming the end of the line of tubing, e.g. by machining or moulding, or by welding a specially formed plastic end piece onto the line; discussed in more detail hereinafter. Preferably the or each shaped end provides an immediate pressuretight fitting with its dispensing head.

Because the relevant line(s) of the present invention can fit directly into the dispensing head(s), metal connector pieces and clips can be dispensed with, saving costs and fitting time. The shaped end(s) of the plastic line(s) can have the same shape as any of the ends of known connector pieces.

The term "dispensing head" is used herein to include any unit, fitting or assembly into and/or through which a beverage or beverage component is supplied at its point of dispensement for drinking. The term includes taps or tap heads, into which e.g. beer lines are often fitted directly, or dispensing head assemblies involving one or more pre-dispensing or pre-tap fittings such as initial mounting blocks and/or mixing bodies, e.g. as used for soft drink post mix dispensers.

The unit of the present invention can be for the supply of one beverage or beverage component, e.g. beer, to a single dedicated dispensing head. Preferably, the unit is adapted for the supply and possible distribution of one or more beverages or beverage components to a plurality of dispensing heads.

There may be any number of source receiving lines and delivery lines, generally depending upon the type, number and/or mixture of beverages or beverage components to be delivered. One or more source receiving lines may extend directly into delivery lines, i.e., single dedicated lines from the source receiving end to the delivery end. One or more of the source receiving lines may alternatively divide into a plurality of delivery lines. One or more source receiving lines may further alternatively be divided through a manifold, which thus extends into a plurality of branch delivery lines. The unit of the present invention may involve any combination of the above.

In one embodiment, the unit is for supplying one beverage such as beer to a single dispensing head, or a number of similar beverages, e.g. a range of beers, to a number of possibly aligned dedicated dispensing heads, the or each bear going through its own dedicated receiving and delivery line.

In another embodiment, the unit is for supplying and distributing one or more beverages such as beer to multiple beer dispensing heads on a tower. Each beer is supplied by one source receiving line, which line is then divided either directly or through a manifold into the number of dispensing heads for that beer.

In a further embodiment of the present invention, the unit is for supplying and distributing one or more soft drinks to multiple dispensing heads. For this, the unit includes a water manifold for the supply of a plurality of branch delivery lines from one source receiving line, and a plurality of direct individual syrup lines. The manifold may have a return line to allow the circulation of water therethrough. The manifold receiving line and syrup lines may be designed to receive the water and syrup directly from sources of water and syrup. Alternatively, the lines are adapted to be connected to existing source supply lines.

The receiving end or ends of the or each source receiving line could also be shaped in a similar manner to that of the or each delivery end, so that each relevant receiving end can be directly connected to their source or source supply. The unit may also include a housing to support the or each source receiving line and delivery line.

Any manifold and its lines may be made of metal, e.g. stainless steel. Alternatively, any manifold and the lines and branches therefrom are also made of plastic, e.g. as described in our co-pending UK Patent application No. 9807189 incorporated herein by way of reference. Using plastic branch lines allows their delivery ends also to be shaped to fit directly into the dispensing heads.

Thus, according to a preferred embodiment of the present invention, there is provided a unit for supplying and distributing beverage components to a plurality of dispensing head assemblies for associated dispensing heads, the unit comprising a housing adapted to support a branched plastic beverage manifold having a water receiving line and a plurality of branch delivery lines for the supply of water, and a plurality of flexible plastic direct syrup lines, the branch water lines and syrup lines being connectable to the dispensing head assemblies, wherein the delivery ends of the branch water lines and syrup lines are shaped to fit directly into the dispensing head assemblies.

In a further preferred embodiment of the present invention, the unit is a lower unit for use in a multiple beverage dispenser.

The unit of the present invention can include any form of cooling and/or insulation around the or each line, preferably within an outer housing. Commonly in a soft drink dispenser, the water is chilled prior to reaching the manifold, and insulation around the manifold and lines is designed to retain the cooling effected. Additional direct cooling could be supplied in or around the manifold or a separate cooling manifold could be added. Where the unit is a tower unit, the manifold and lines are usually encased by insulation.

Preferably, the liquid is a beverage or beverage component, e.g. beer, cider, water, soda, syrup, etc. A number of such lines could be included in a beverage tower unit.

Where the delivery end of a line is shaped by reforming, any plastic materials may be used. Where the delivery end is shaped by the addition by welding of an end place, the line and end piece are usually thermoplastics, e.g. a nylon, a polyethylene or a polypropylene. Butt welding of relatively large bore plastic tubing is well known in the art. But welding of relatively small bore plastic tubing less so.

Thus, according to a second aspect of the present invention, there is provided a process for forming an integral line of plastic tubing from the two pieces of plastic tubing having an outer diameter of 30 mm or less wherein two ends of the two tubing pieces are simultaneously heated by one or more heading elements, the heating element(s) are disengaged and the heated ends moved together for a predetermined time and pressure to effect a weld between the heated surfaces. If necessary or desired, the interior and/or exterior weld beads could be removed to give a smooth interior and/or exterior surface by machining, boring, cutting, etc. The present invention also extends to a plastic tubing line whenever so formed.

The present invention also extends to apparatus to butt weld two pieces of plastic tubing of 30 mm or less outer diameter, the apparatus comprising a heating element having two outwardly opposing heating faces and a gripping means to hold each piece in an aligned relationship, at least one gripping means being reversibly moveable between engaged and disengaged positions, wherein the gripping means and/or the heating means moves to engage the opposing end surfaces of the pieces to be welded, and following disengagement of the heating means, the moveable gripping means moves to locate the heated surfaces together for a predetermined time and pressure to effect the weld between the surface.

Welding is a simple and easy method of adding any type or form of suitable plastic end piece onto free ends of plastic tubing. The end pieces can be straight, curved, bent, flanged, etc., indeed of any shape, size or design. Welding also creates an easy method of adding different sized end pieces to different or standard bore tubing, e.g., to accommodate the different shapes or entry ports of different dispensing head manufacturers. Such flexibility and lack of dependence on the shape of the entry port of the dispensing head allows the line-tubing manufacturers greater freedom for the design and fitting arrangement of beverage supply lines.

According to a third aspect of the present invention, there is provided a flexible plastic liquid supply line, wherein one or both ends are formed to allow direct pressuretight fitting into a receiving port.

BRIEF DESCRIPTION OF THE DRAWINGS

Embodiments of the present invention will now be described by way of example only and with reference to the following diagrammatic drawings in which.

DETAILED DESCRIPTION

Figure 1:
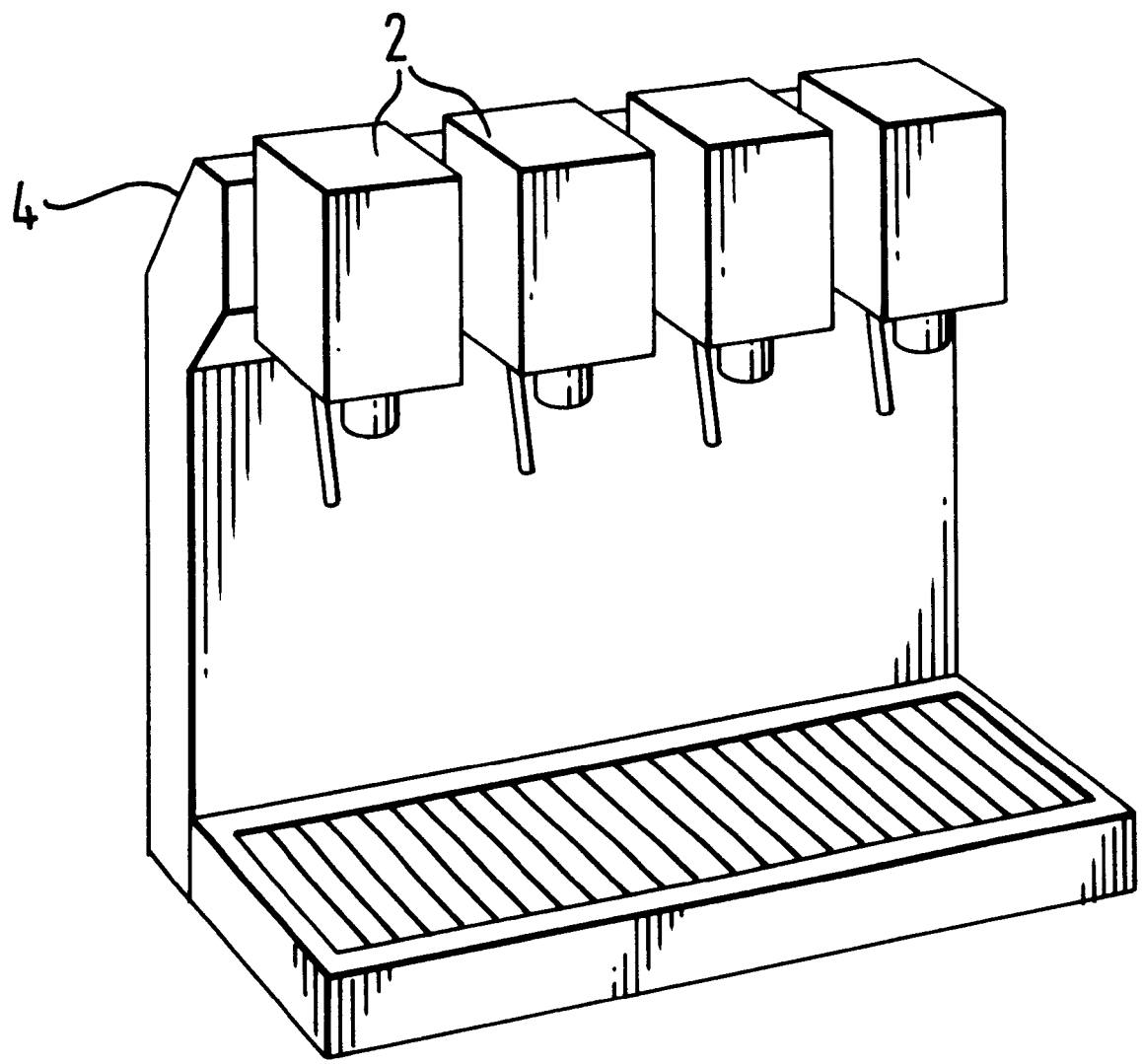
FIG. 1 is a perspective view of the serving part of a post mix beverage dispenser common in the art.

Referring to the drawings, FIG. 1 shows the serving part of a standard post mix multiple soft drink dispenser having four dispensing head assemblies 2 supported on aback frame 4. The dispenser is commonly used to dispense soft drinks such as cola, fizzy orange, squashes, lemonade etc., with generally one type of drink to each head 2. This is achieved by supplying individual drink syrups to each head assembly 2 alongside a common supply of still or carbonated water (hereinafter collectively called "water"). The sources of syrups and water are commonly stored underneath or otherwise nearby the dispenser, and hidden from the customer. A fuller description of a complete dispenser may be found in e.g. U.S. Pat. No. 5,337,759 or GB 2301580A.

Figure 2:
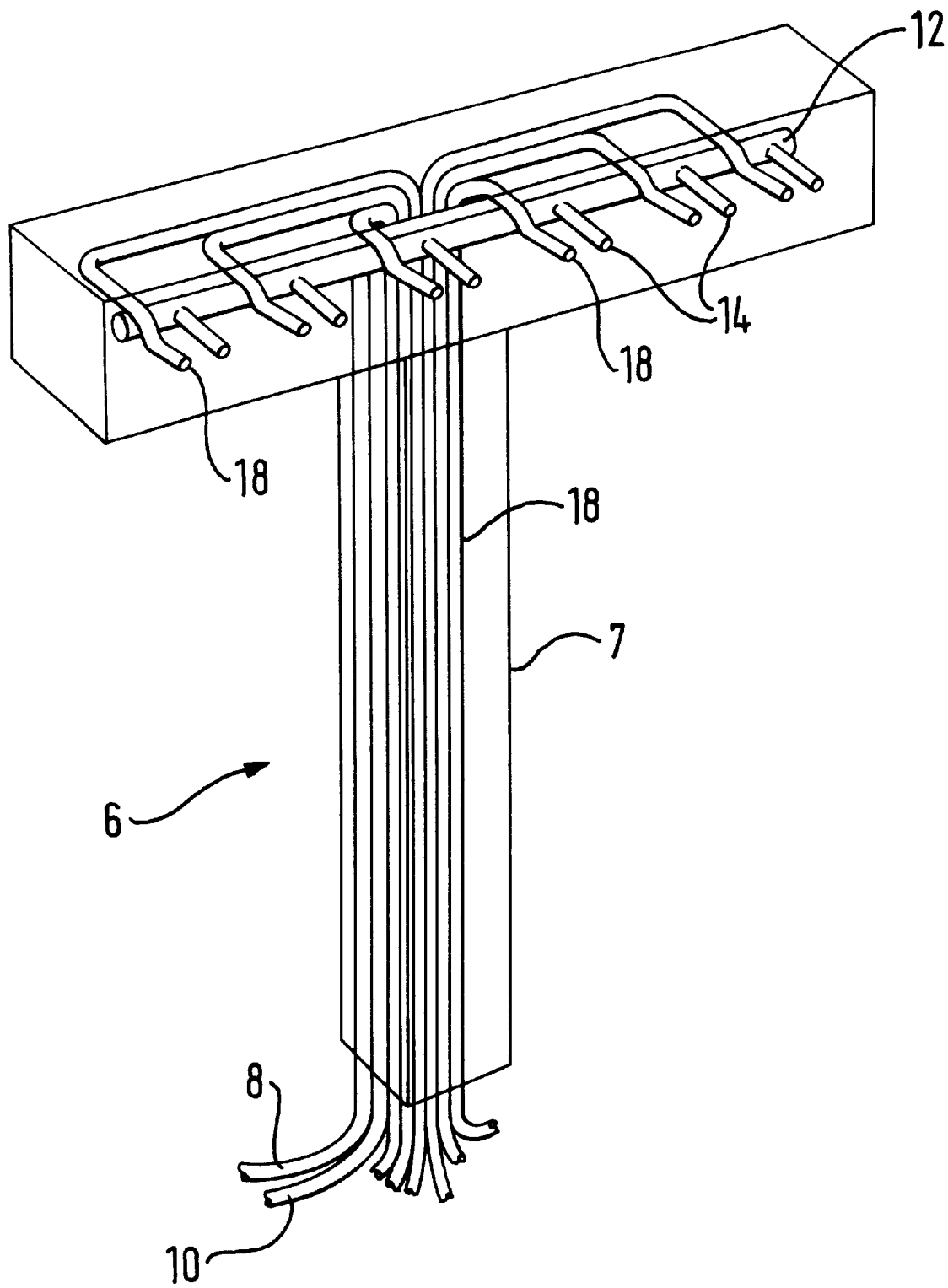
FIG. 2 is a perspective view of a tower unit and its internal piping layout according to one embodiment of the present invention.

FIG. 2 shows a tower unit 6 for distributing beverages to the mounting blocks (see FIGS. 3 and 4) for six dispensing head assemblies. The apparatus comprises a housing 7 having the outline of a typical "T" shaped tower unit e.g. for use in the back frame 4 of the dispenser in FIG. 1. Main water receiving and return lines 8, 10 circulate water into and around a transverse manifold 12. The manifold 12 has six branch delivery lines 14 extending therefrom, one or each intended dispensing head assembly. As the water is the major component of the soft drinks, it is constantly chilled and circulated, and rechilled if necessary (by apparatus not shown).

The manifold 12, its receiving and return lines 8, 10 and its branch lines 14 can be made of a metal, e.g. copper or stainless steel. As this can provide a very rigid body around which everything else in the housing 7 must be structured, these parts can alternatively all be made from plastic, e.g. medium density polyethylene (MDPE). The parts can be welded together as described in our co-pending UK Patent Application No. 9807189.

FIG. 2 also shows six individual syrup lines 18, one for each dispensing head assembly. The syrup lines 18 are made from MDPE tubing to provide flexibility. They can therefore easily be manipulated into the desired path within the housing 7. The syrup lines 18 extend directly from their source receiving ends to their delivery ends.

The tower unit 6 can be supplied as a separate unit for fitting into the back frame of a post mix dispenser such as that shown in FIG. 1. It is ready for immediate connection to the relevant dispensing head assemblies and supply sources. To connect the tower lines with the supply sources, either the lines could be made of sufficient (or at least extra) length, or the receiving ends of the lines as they extend from the bottom of the tower unit 6 could be formed or adapted to fit intermediate source lines.

Figure 3:
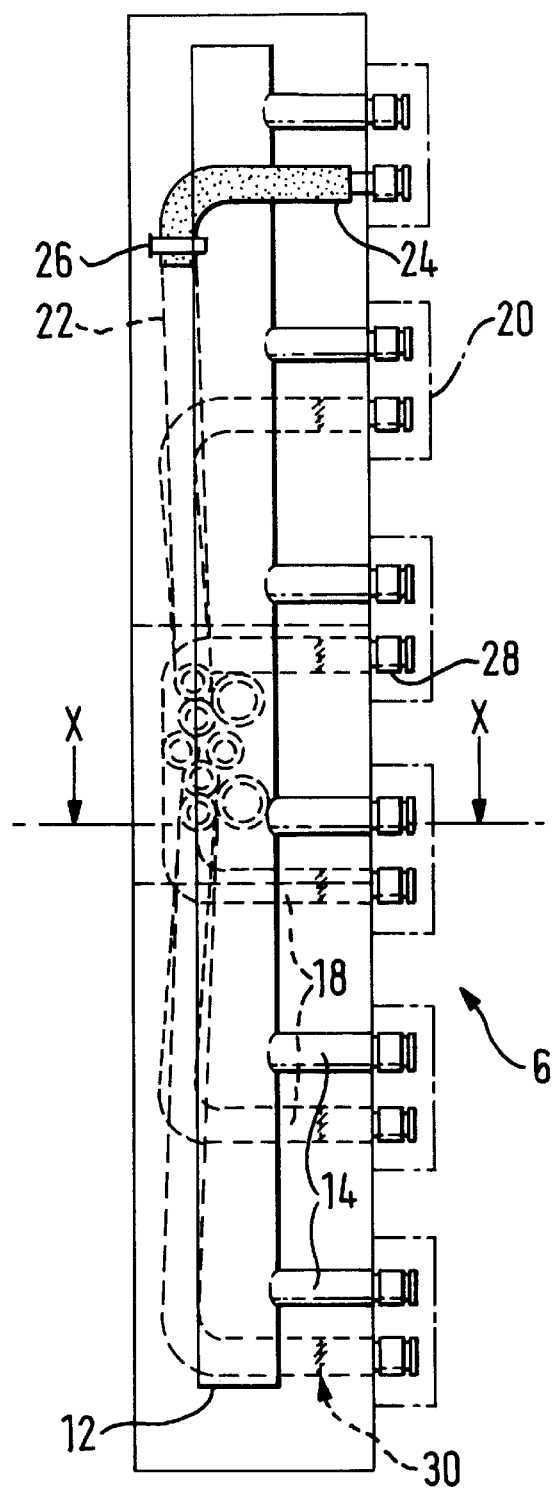
FIG. 3 is a top internal view of the tower in FIG. 2 (with one modified prior art connection for illustration only)

FIG. 3 shows the top view of the tower unit 6. The branch lines 14 of the water manifold 12 and the syrup lines 16 pass into the ports of the mounting blocks 20 (shown in dashed line) of the assemblies.

The delivery end of the uppermost syrup line 22 shown in FIG. 3 has been modified to show a prior art curved connector piece 24 as an illustration thereof only. Such pieces 24 are made from stainless steel, and requires a jubilee clip 26 between the line 22 and piece 24 to prevent leakage. In the confines of a tower unit 6, there is usually little room to fit and secure the clip 26.

Figure 4:
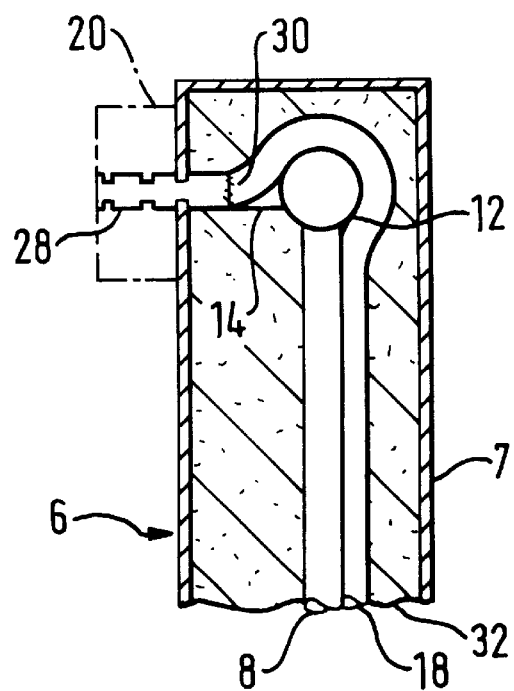
FIG. 4 is a cross-sectional side view along line XX in FIG. 3.

As shown for all the other syrup lines 18 in FIG. 3, a specially formed plastic end piece 28 (shown in enlarged form in FIG. 5a) is welded onto the delivery ends of the syrup lines 18, so that the complete syrup lines 18 are one piece, and are still entirely flexible around the other parts in the tower unit 6 (e.g. the manifold 12, see FIG. 4). The end pieces 28 are so formed as to be able to fit directly into the mounting block 20 ports and provide a pressuretight fitting therewith. FIGS. 3 and 4 show the weld lines 30.

Whilst the plastic end pieces 28 could be welded onto the main length of standard syrup line tubing in situ, preferably the complete syrup lines 18 are preformed, and then easily fitted and arranged in the tower skeleton or frame.

FIG. 4 is a cross-section along line XX in FIG. 3, and shows the flexibility possible using the present invention. The arrangement of the syrup lines 18 is not limited by the shape of the metal connector pieces 24, and manufacturing time is reduced by dispensing with the need for separate connector pieces 24 and clips 26.

The tower unit 6 could include one or more cooling lines or cooling manifolds designed to provide cooling to the water as close as possible to dispensement. The lines in the tower are also preferably insulated, either directly and/or by surrounding insulation. FIG. 4 shows the lines 8, 14, 18 and manifold 12 surrounded by insulation 32 within the housing 7. FIG. 4 also shows the ability to fit the syrup lines 18 around the manifold 12 to effect trace cooling of the syrup lines 18.

Figure 5A:
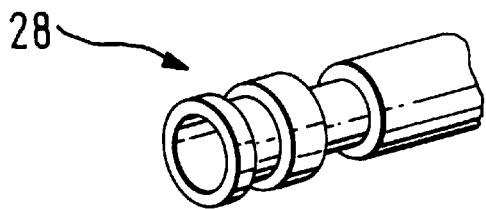
FIG. 5a is an enlarged perspective view of a supply line end piece.
Figure 5B:
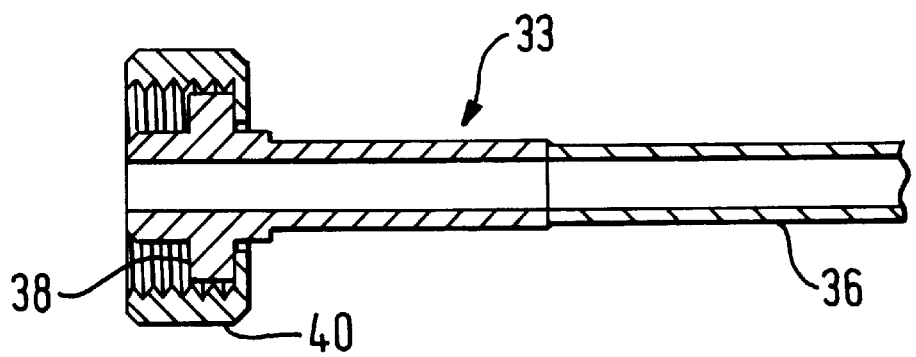
FIGS. 5b and 5c are cross-sectional side views of two further supply line end pieces welded to the ends of plastic tubing.
Figure 5C:
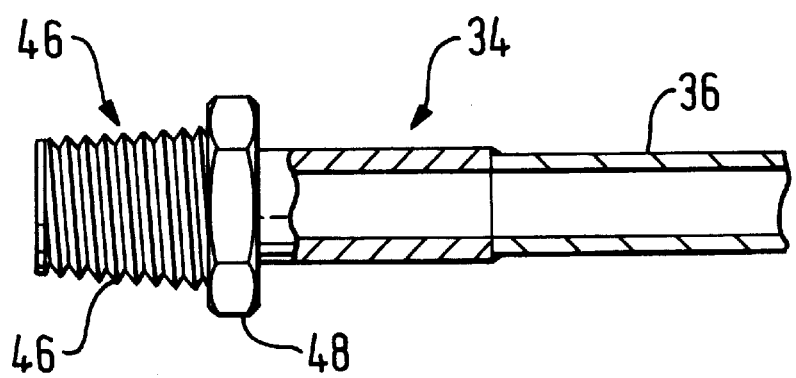

FIG. 5a is an enlarged view of a formed end piece 28, formed e.g. by injection moulding. The end piece 28 preferably has the same inner bore as the main syrup line tubing. FIGS. 5b and 5c show two further possible end pieces, 33 and 34 respectively, welded to the normal cut end or face of a standard piece of tubing 36, e.g., the main length a branch water and/or a syrup line. FIG. 5b shows an end piece 33 having an annular 38, around which a threaded nut 40 can be placed to secure the annulus 38 against another part or port. FIG. 5c shows another end piece 34 having a shaped end 44 with a screw thread 46 and nut-shaped head 48. Onto the thread 46 could be filled, easily, quickly and reversibly, many types of known connections, or even end caps to seal the line when desired. Such threaded coupling pieces 34 provide significant adjustability for change.

Figure 6:
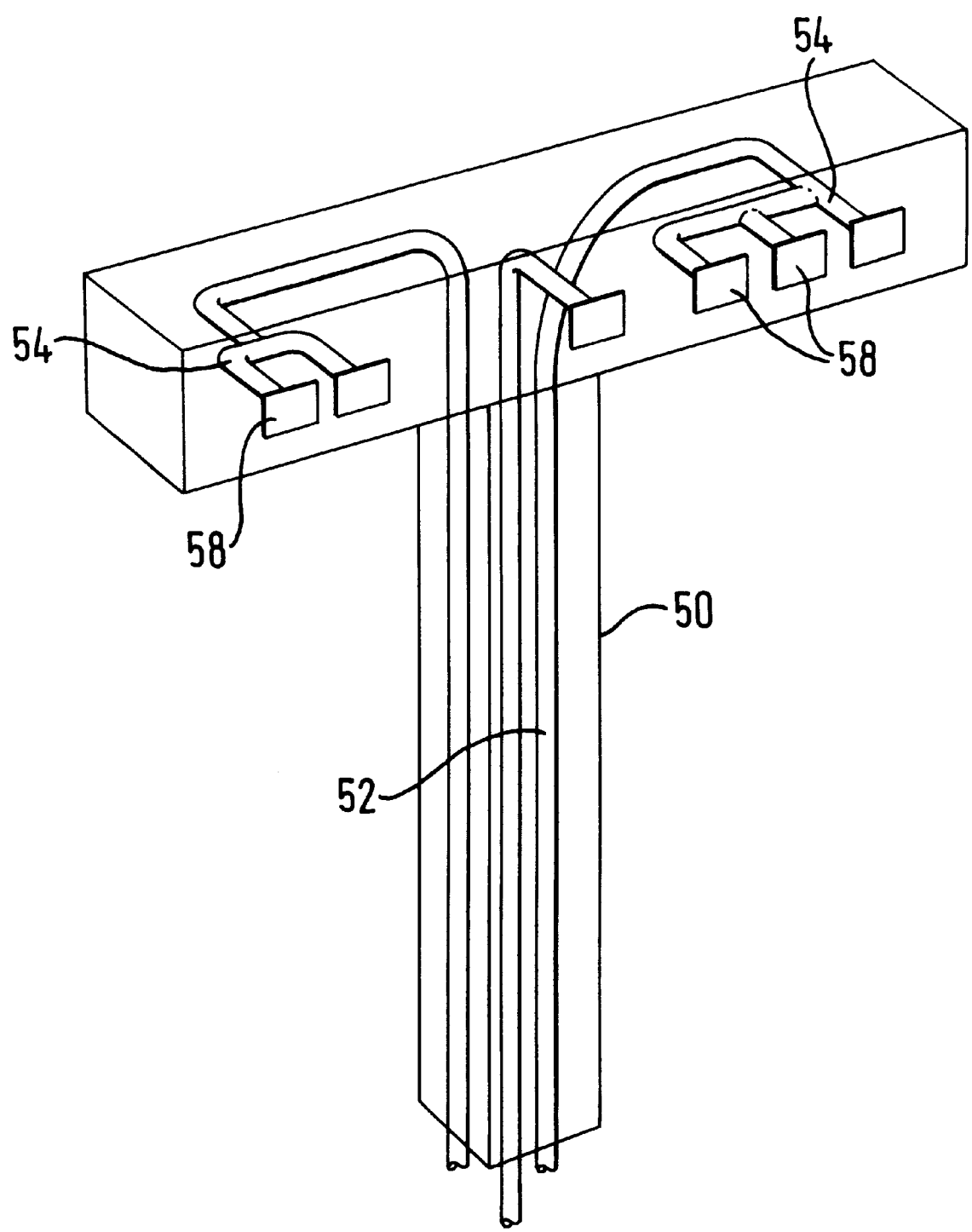
FIG. 6 is a perspective view of a tower unit and its internal piping layout according to a second embodiment of the present invention.

FIG. 6 shows a tower 50 according to a second embodiment of the present invention. The lower 50 has three source receiving lines 52, two of which divide as shown so that the three receiving lines extend into six delivery lines 54 which fit into six mounting blocks 58 for dispensing heads, e.g. taps. Each receiving line 52 supplies a different beer, which beers are then dispensable from one, two and three independent dispensing heads. The tower 50 could include cooling, e.g. a transverse cooling manifold, and insulation (not shown).

The unit of the present invention is clearly able to be used in the single or multiple supply and distribution of any type of beverage in which the delivery lines must fit into a port or valve, e.g., a tap unit, prior to dispensement. It is particularly suitable for use in space- or design-limiting dispensement arrangements such as tower units.

Variations and modifications can be made without departing from the scope of the invention described above.

The foregoing relates to a preferred exemplary embodiment of the invention, it being understood that other variants and embodiments thereof are possible within the spirit and scope of the invention, the latter being defined by the appended claims.

I claim:

1. A unit for supplying at least one beverage and at least one beverage component from at least one beverage source and at least one beverage component to at least one dispensing head, comprising at least one source receiving line extending into at least one delivery line for connection to the at least one dispensing head, wherein at least one of the lines is plastic tubing and the delivery ends of the at least one delivery line which is integrally shaped as an end piece to fit directly into the at least one dispensing head.

2. A unit as claimed in claim 1, wherein the at least one shaped end is shaped by reforming the end of the at least one line into an end piece.

3. A unit as claimed in claim 1, wherein the at least one shaped end is shaped by butt welding a formed plastic end piece onto the at least one line.

4. A unit as claimed in claim 1, for supplying at least one beverage and at least one beverage component to a plurality of dispensing heads.

5. A unit as claimed in claim 4 wherein at least one source receiving line is connected to a manifold and a plurality of supply branch delivery lines are secured to said manifold.

6. A unit as claimed in claim 5 wherein at least one source receiving line divides into a plurality of delivery lines.

7. A unit s claimed in claim 4 wherein a plurality of course lines extend directly into delivery lines.

8. A unit as claimed in claim 4, wherein the delivery ends of all the delivery lines are shaped to fit directly into the dispensing heads.

9. A unit as claimed in claim 6, wherein the delivery lines are shaped to fit directly into the dispensing heads.

10. A unit as claimed in claim 1, further comprising a housing adapted to support the at least one source receiving lines and each of the at least one delivery line.

11. A unit as claimed in claim 1, wherein the at least one beverage and the at least one beverage components are selected from the group consisting of beer, cider, water, soda, and syrup.

12. A unit as claimed in claim 1, which comprises a tower unit for use in a multiple beverage dispenser.

13. A unit as claimed in claim 12, wherein the tower unit includes cooling and insulation.

14. A unit as claimed in claim 1, wherein the receiving ends of each source receiving line is shaped to fit directly into the source supply.

15. A flexible plastic liquid supply line, according to claim 1, having two ends wherein both ends are formed to allow pressure tight fitting into a receiving port.

16. A beverage dispenser for supplying at least one beverage from a beverage source and at least one beverage component from at least one component source to at least one dispensing head having a delivery tube receiving opening therein, the dispenser comprising, at least one delivery line for connection to said at least one delivery head, said at least one delivery line being a plastic tubing and having an integral delivery end piece adapted to be received in said receiving opening, and retaining means integrally formed at said delivery end piece for retaining said delivery end piece in fluid-tight relation in said receiving opening.

17. The beverage dispenser defined in claim 16 wherein said end piece is separately formed from plastic material and integrally joined to said plastic tubing by butt welding.

18. The beverage dispenser defined in claim 16 wherein said retaining means on said end piece is formed from the plastic material of said tubing by initially forming the tube then reshaping the end portion of the tube.

* * * * *